June 22, 1943.   A. A. HORVATH   2,322,516
FIXATION PROCESS
Filed Feb. 1, 1940
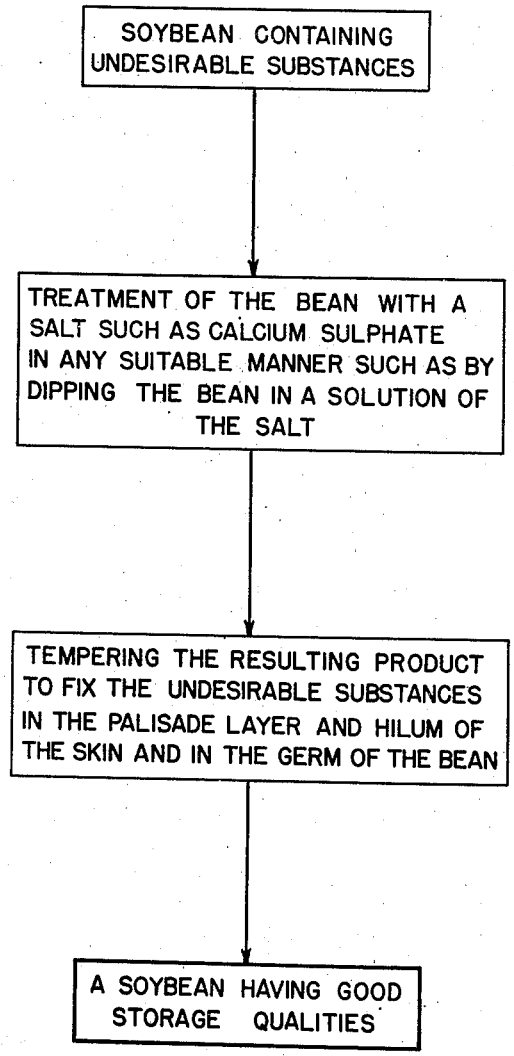
Inventor
ARTEMY A. HORVATH
By Semmes, Keegin & Semmes
Attorneys Patented June 22, 1943

2,322,516

UNITED STATES PATENT OFFICE 2,322,516

FIXATION PROCESS

Artemy Alexis Horvath, Chambersburg, Pa., assignor to Horvath Laboratories, Inc., Chambersburg, Pa., a corporation of Maryland Application February 1, 1940, Serial No. 316,831

8 Claims. (Cl. 99—98)

This invention relates to a process for treating soya, and more especially to a process for imprisoning undesirable substances contained in the soya seed coat and germ.

It is well known that the soybean is without peer as a valuable and wholesome source of dietary elements. For example, the soybean is the richest in protein of all the known foods except dried egg white. It is also a source of many valuable products such as flour, bean cake, sauce, cheese and oil.

However, the soybean seed coat and germ contain, in addition to coloring matter, many other substances which impart undesirable properties to these final products. Among these substances may be mentioned certain compounds which impart a bitterness or other unpleasant taste, objectionable color or odor to the products as well as the tannins which are stringent in nature. Most of these substances are either volatile or diffusible in the presence of moisture.

These substances are present in the outer or so-called "palisade" layer of the coat of the bean which includes the region of the hilum (navel) where the palisade layer is double. Moreover, they are found in the germ of the bean and in the fibrovascular bundle which binds the germ of the bean to the hilum.

It is also known that approximately 1.0 per cent by weight of the palisade layer, and 2.0 per cent of the germ and fibrovascular bundle consists of phosphatides of an unstable type. This instability is caused by the presence in these compounds of highly unsaturated fatty acid radicals having as many as three or more double links. The oxidation of such compounds tends to impart rancidity to the finished product.

For the above reasons soybeans in bulk tend to deteriorate rapidly and become rancid if the skin or germ is damaged. As indicative of this fact, the Federal grade of soybeans is partly determined by the percentage of split beans present, not over one per cent of split beans being permitted in the premium grade. The number two grade which is the basic grade for industrial purposes permits the presence of 10 per cent of these damaged beans.

The unsaturated phosphatides mentioned, however, must be distinguished from the more saturated phosphatides which are present in the cotyledons of the bean. These phosphatides are not as unsaturated as those previously mentioned and are therefore more stable. In addition, they appear to have the property of inhibiting deterioration.

Hitherto, a number of processes have been evolved to prevent the objectionable substances which have been previously mentioned from imparting undesirable characteristics to the products obtained from soya. Most of these processes can be grouped into two types. One of these types consists in attempts to extract the undesirable substances by prolonged leaching, while in the other the volatile substances are removed by means of distillation. Neither of these types are wholly effective and both have undesirable features.

For example, in the extraction type of process, the leaching step must necessarily be prolonged for a number of hours. On the other hand in the distillation type of process, only the undesirable substances which can be volatilized are removed, leaving behind the non-volatile bitter substances, the tannis and unstable phosphatides. Moreover, the vaporization of the volatile substances, which is conducted in the presence of an excess of moisture, aids in the diffusion of these non-volatile substances throughout the cotyledons of the bean seed.

One of the objects of my invention is to provide a process for treating soya to imprison the undesirable substances present in the bean by applying a metallic salt to the surface of the bean.

Still another object of my invention is to provide a method for treating soya to imprison the undesirable substances present in the bean by treating the palisade layer of the skin, the hilum, and germ of the bean with a metallic salt, and then subjecting the resulting product to a tempering step.

A further object of my invention is to provide a method for treating soya to imprison the undesirable substances present in the skin and germ of the bean in order to increase the storage qualities of the bean and free its final products from the presence of these undesirable substances.

With these and other objects in view, my invention embraces broadly the idea of applying to the surface of soybeans a metallic salt or mixture of salts and then tempering the resulting product to fix in the skin and germ the undesirable phosphatides and other objectionable compounds. In this process any organic or inorganic metallic salt which is non-poisonous may be used. However, I have found that those non-poisonous metals which provide divalent and trivalent ions in solution are especially effective. Among these substances may be mentioned compounds of calcium, magnesium, aluminum, and iron (both ferrous and ferric).

Among the salts of these metals which are especially effective may be mentioned the sulphates, carbonates, acetates, lactates, and phosphates of calcium, magnesium, aluminum and iron, alum, and the chlorides of calcium, and magnesium. In this connection, it should be noted that, although the color of the products prepared from beans treated with the salts of iron are slightly darkened, both iron and aluminum combine readily with the tannins and phosphatides in the skin and germ and lock them into place.

In addition to the salts mentioned above, the invention contemplates the use of any other salt of these metals or of any metal, except those poisonous in character. For this latter reason, none of the fluorides are utilized because these compounds are poisonous if present in concentrated form.

The single sheet of drawings discloses a flow sheet illustrative of one form of the invention.

In practicing my process, the selected salt or mixture of salts is applied to the beans to be treated in such a manner that the compounds will permeate the palisade layer of the skin and enter the minute orifice of the hilum called the micropyle. This effect can be accomplished by mixing the salt with a liquid carrier. Whether or not this admixture will form a solution will, of course, depend upon the salt and carrier selected. Preferably a carrier is selected which is a complete or partial solvent for the salt to be employed, but this is not necessary if the ingredients are not allowed to separate.

In one form of the process, this step is accomplished by dipping the beans in the mixture formed by the selected salt or mixture of salts and the carrier in order to bring the salt in contact with the desired parts. However, if desired, the mixture may be passed around or sprayed on the beans. In any event, it is only necessary and desirable to subject the beans to the mixture for a sufficient time to allow the mixture to penetrate the palisade layer of the outer skin of the bean.

Simultaneously, the fluid enters the micropyle of each bean which enables the metallic ion to form a thin film over the outer part of the germ, the two palisade layers of the hilum, and the fibrovascular bundle which connects the germ to the hilum. In this manner a thin layer of metallic ions is brought in contact with the undesirable substances such as tannins and unsaturated phosphatides which are found in the above enumerated layer of the skin, hilum, and germ of the bean.

This treatment of the beans should not be confused with a step of soaking beans. These steps may be readily distinguished because no moisture is absorbed by the cotyledons during the treatment, such as "dipping," contemplated in this invention while, on the other hand, when beans are soaked the cotyledons absorb moisture up to two and one-half times their volume. This absorption is harmful because the moisture activates the lipases, oxidases and perioxidases present in the cotyledons, and this activity results in the splitting of the phosphatides contained within the cotyledons and of oil molecules resulting in the liberation of free fatty acids which upon oxidation break down to form oxyacids, aldehydes and ketones which are toxic.

For the above reasons the term "applying" in this specification and claims will designate methods of bringing the selected salt into contact with the bean in such a manner that the palisade layer, hilum, and surface of the germ of the bean will absorb the salt without there being any substantial absorption by the cotyledons, except in the case of split beans, such as occurs if the beans are soaked.

As an example of the first step of the process, if calcium sulphate is selected as the metallic salt, an aqueous solution, which may be composed of one part calcium sulphate to five hundred parts of water, is "applied" to the bean in any suitable manner such as by "dipping." If the dipping method is used, it is usually necessary to keep the beans in the solution for a period of about two minutes. However, by any means of "applying" it is only necessary for the calcium sulphate to penetrate the palisade layer and the orifices of the hilum. In this treatment the seed coat of the bean is not wrinkled and water is not absorbed by the cotyledons.

After the beans have been treated with the metallic mixture, they are subjected as a final step to a "tempering" period which immobilizes the undesirable substances and phosphatides. The present theory is that this fixation is caused either by a direct chemical combination of the metallic ions with these substances, thereby rendering them insoluble, or by a chemical reaction between these metallic ions and the protein molecules to which these undesirable substances are linked, thereby impairing their mobility. It is possible that both of these reactions occur. In any event, only sufficient heat is required to carry out this reaction, and therefore this "tempering" step is in no sense a "cooking" step.

By means of this process, the keeping qualities of the bean are greatly enhanced because oxidation of the unsaturated phosphatides is prevented, as has been previously described. Moreover, deterioration is prevented, because the undesirable substances are immobilized by the previously described treatment, if the beans become wet or the skin or germ is broken in storage or shipment, thereby enabling the undesirable substances from the broken fragments of skin and germ to permeate the surface of the cotyledons.

In addition, if the skin and germ are removed after treatment and separated from the cotyledons, the small portion of the germ which usually remains cannot start deterioration or impart undesirable characteristics to the cotyledons because the undesirable substances are imprisoned by the previously described treatment. This result is important in view of the well known fact that when the germ is not insulated in this manner deterioration is marked and rapid even when the skin and germ are removed immediately after harvesting.

Moreover, the fixation of the undesirable substances in the palisade layer of the skin, as well as in the germ, prevents these substances from being leached or diffused out so that they can permeate the cotyledons during removal of the skin or when the beans become dampened or are soaked in water preliminary to cooking. Without this treatment, these undesirable substances under such conditions would start deterioration of and impart undesirable characteristics to the cotyledons in the manner which has previously been described.

From the above description, it is believed obvious that I have invented a process for fixing the undesirable substances located in the skin and germ of the soybean so that it is impossible for these substances to come in contact with the cotyledons after the treatment.

After being subjected to this process the beans may be either stored or the skin and germ can be immediately removed without danger of the cotyledon coming into contact with these undesirable substances. The cotyledons may also be processed in any desired manner. For example, if desired, the oil may be removed by means of any suitable method or the product made into flour. In any event, the cotyledon and resulting product such as the oil or flour will be free from undesirable coloring matter, bitter or stringent substances, or unsaturated compounds which will affect its keeping properties.

While for purposes of illustration I have described only a few of the metallic salts which can be used in this process and only one method of carrying on the process, it is obvious that the invention is of broader scope.

I claim:

1. A method of fixing undesirable substances in the skin and germ of whole soy beans comprising applying to whole soy beans a non-poisonous ionized liquid mixture containing a non-poisonous salt of a metal from a group consisting of iron, calcium and magnesium, said application being continued for a sufficient period to enable the mixture to penetrate the palisade layer and hilum of the outer skin of each bean without being absorbed by the cotyledon and then tempering the treated beans by heating without cooking.

2. A method of fixing undesirable substances in the skin and germ of whole soy beans comprising applying to whole soy beans a non-poisonous ionized liquid mixture containing a non-poisonous salt of calcium, said application being continued for a sufficient period to enable the mixture to penetrate the palisade layer and hilum of the outer skin of each bean without being absorbed by the cotyledon and then tempering the treated beans by heating without cooking.

3. A method of fixing undesirable substances in the skin and germ of whole soy beans comprising applying to whole soy beans an ionized liquid mixture containing calcium sulphates, said application being continued for a sufficient period to enable the mixture to penetrate the palisade layer and hilum of the outer skin of each bean without being absorbed by the cotyledon and then tempering the treated beans by heating without cooking.

4. A method of fixing undesirable substances in the skin and germ of whole soy beans comprising applying to whole soy beans a non-poisonous ionized liquid mixture containing a non-poisonous salt of magnesium, said application being continued for a sufficient period to enable the mixture to penetrate the palisade layer and hilum of the outer skin of each bean without being absorbed by the cotyledon and then tempering the treated beans by heating without cooking.

5. A method of fixing undesirable substances in the skin and germ of whole soy beans comprising applying to whole soy beans a non-poisonous ionized liquid mixture containing a non-poisonous salt of iron, said application being continued for a sufficient period to enable the mixture to penetrate the palisade layer and hilum of the outer skin of each bean without being absorbed by the cotyledon and then tempering the treated beans by heating without cooking.

6. A method of fixing undesirable substances in the skin and germ of whole soy beans comprising dipping whole soy beans in a non-poisonous ionized liquid mixture containing a non-poisonous salt of calcium, said soy beans being immersed in the liquid mixture to enable the mixture to penetrate the palisade layer and the hilum of the outer skin of each bean and said beans being removed before the liquid mixture is absorbed by the cotyledons and then tempering the treated beans by heating without cooking, for a sufficient period to immobilize the undesirable substances situated in the palisade layer, germ and fibrovascular bundle of each bean.

7. A method of fixing undesirable substances in the skin and germ of whole soy beans comprising dipping whole soy beans in a non-poisonous ionized liquid mixture containing a non-poisonous salt of iron, said soy beans being immersed in the liquid mixture to enable the mixture to penetrate the palisade layer and the hilum of the outer skin of each bean and said beans being removed before the liquid mixture is absorbed by the cotyledons and then tempering the treated beans by heating without cooking, for a sufficient period to immobilize the undesirable substances situated in the palisade layer, germ and fibrovascular bundle of each bean.

8. A method of fixing undesirable substances in the skin and germ of whole soy beans comprising dipping whole soy beans in a non-poisonous ionized liquid mixture containing a non-poisonous salt of magnesium, said soy beans being immersed in the liquid mixture to enable the mixture to penetrate the palisade layer and the hilum of the outer skin of each bean and said beans being removed before the liquid mixture is absorbed by the cotyledons and then tempering the treated beans, by heating without cooking, for a sufficient period to immobilize the undesirable substances situated in the palisade layer germ and fibrovascular bundle of each bean.

ARTEMY ALEXIS HORVATH.